といった

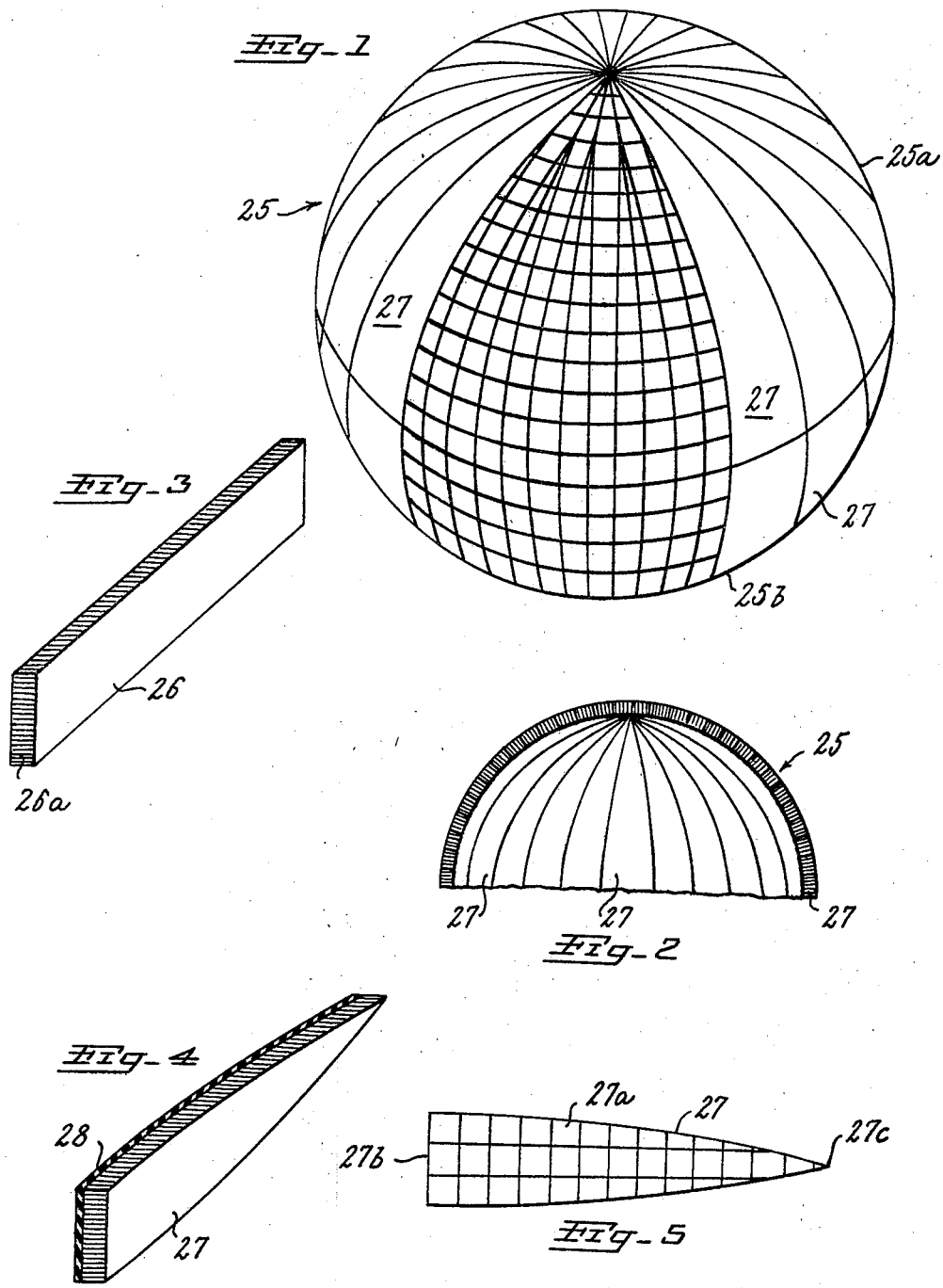

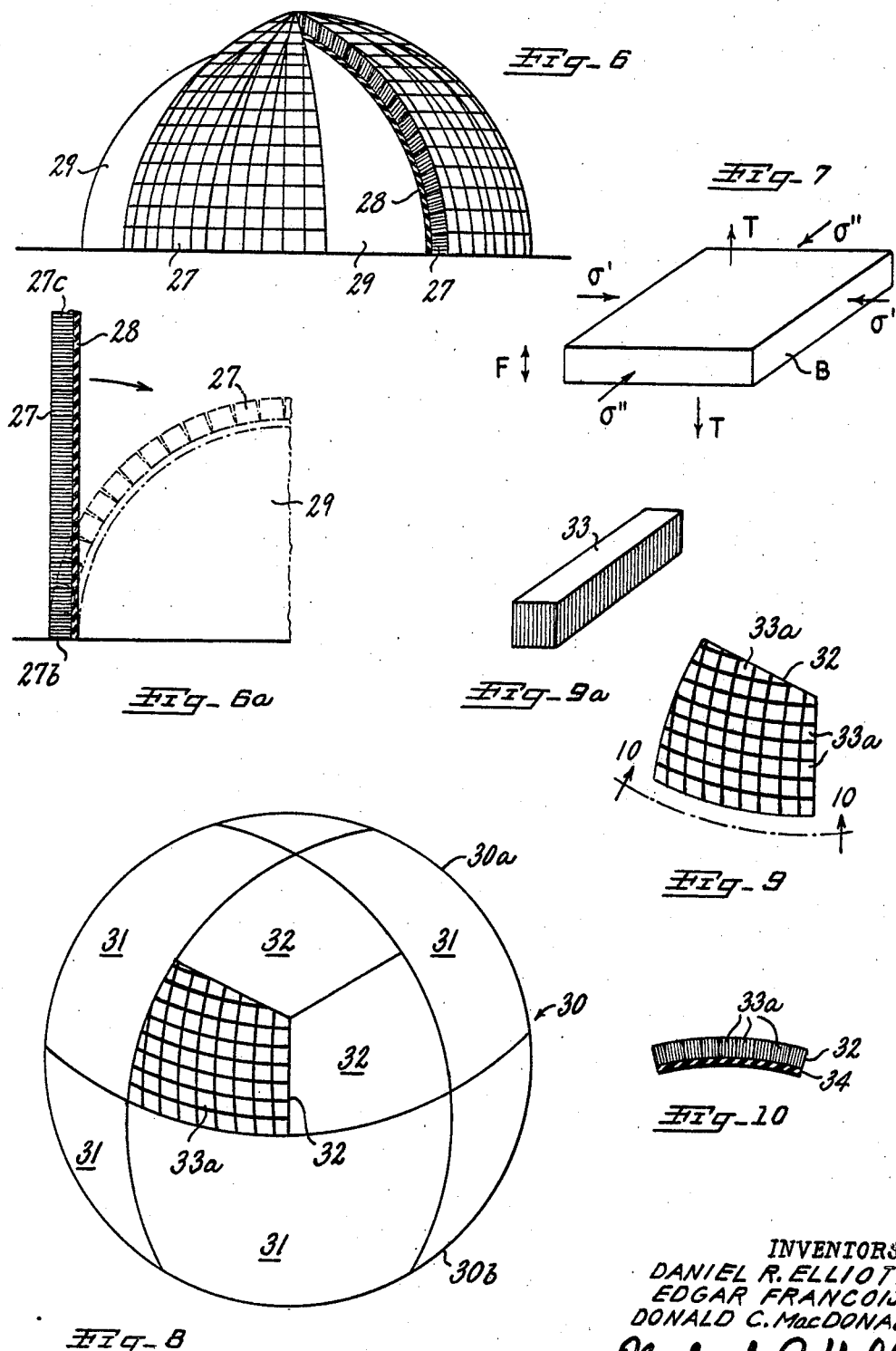

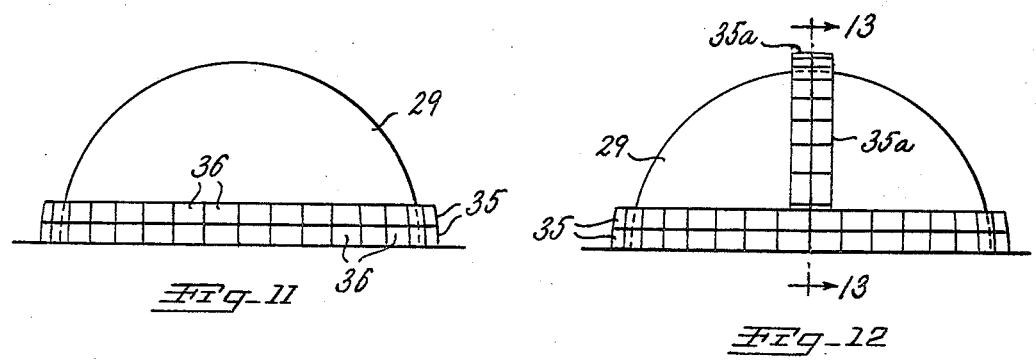
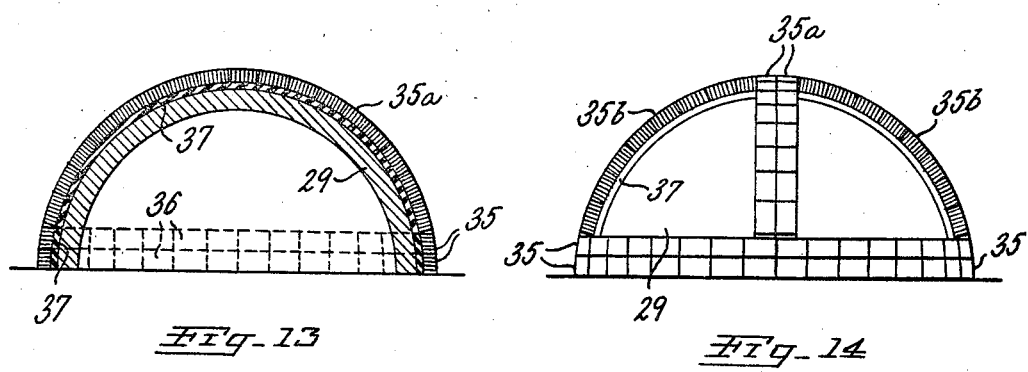
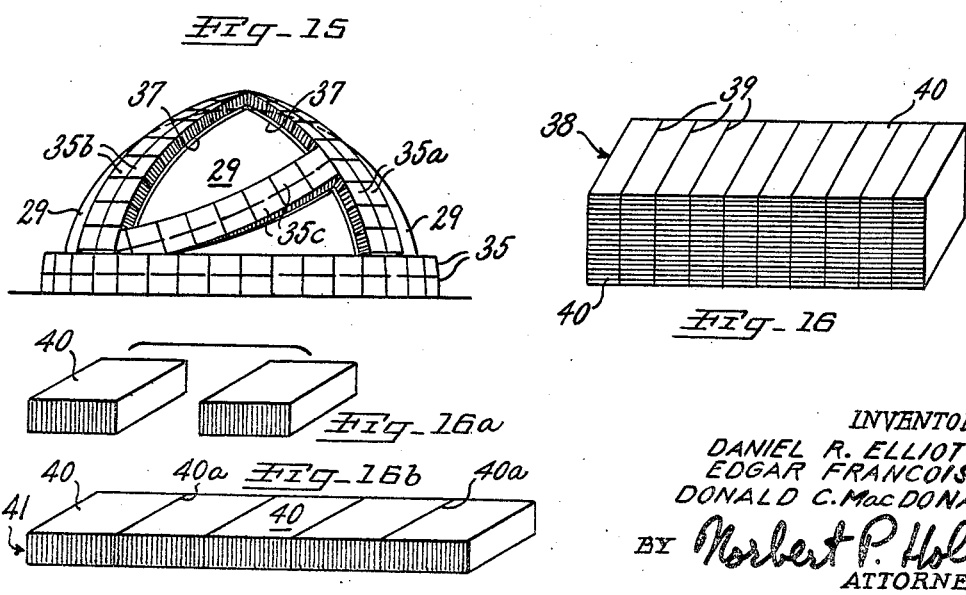
INVENTORS
DANIEL R. ELLIOTT
EDGAR FRANCOIS
DONALD C. MacDONALD
BY Norbert P. Holler
ATTORNEY

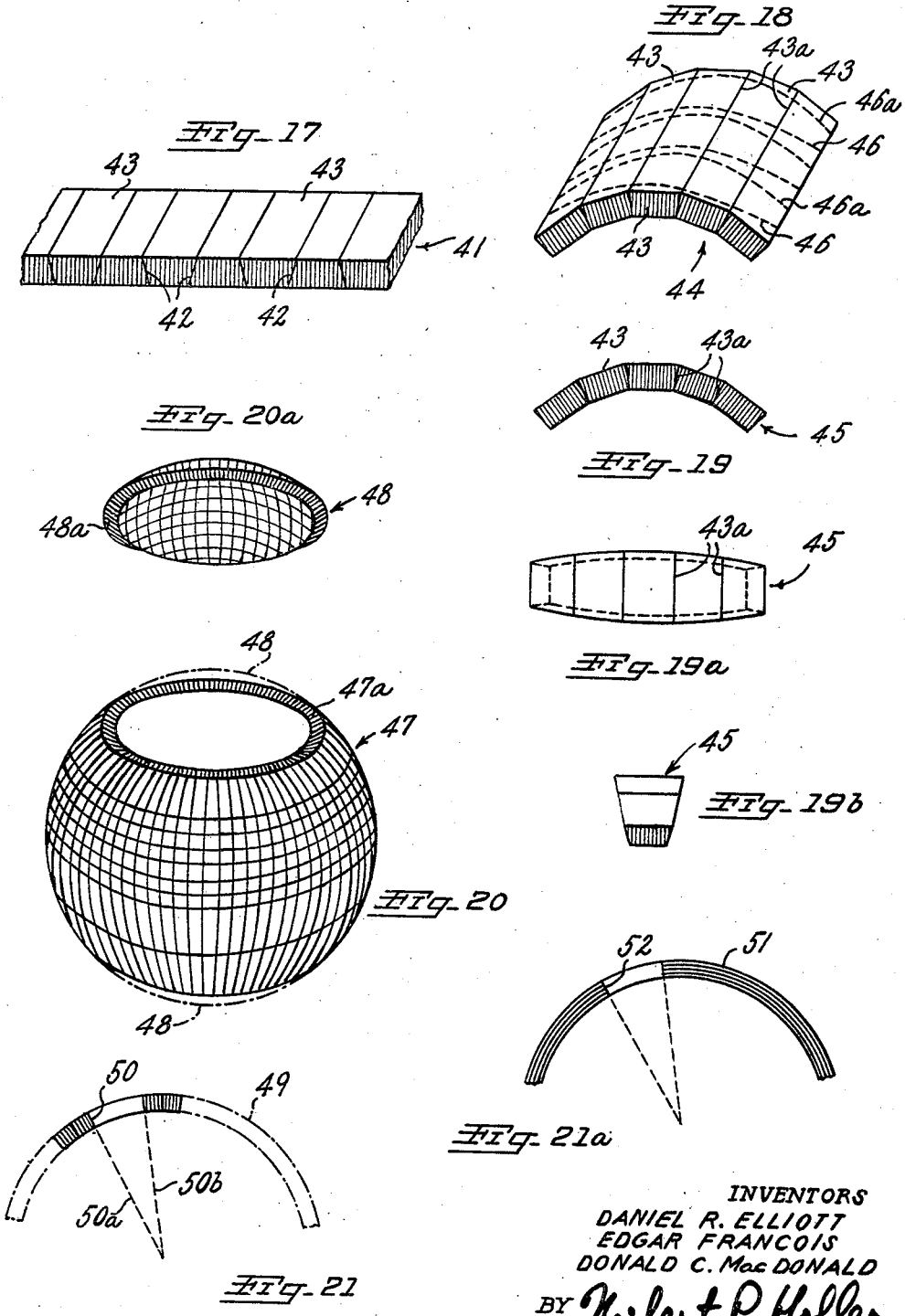

United States Patent Office 3,490,638
Patented Jan. 20, 1970

3,490,638
RADIAL-FILAMENT SPHERES
Daniel R. Elliott, Ridgewood, Edgar Francois, Wayne, and Donald C. MacDonald, Ridgewood, N.J., assignors to Uniroyal, Inc., New York, N.Y., a corporation of New Jersey
Filed Jan. 24, 1966, Ser. No. 522,675
Int. Cl. B65d 1/16, 1/40
U.S. Cl. 220—5                  11 Claims

ABSTRACT OF THE DISCLOSURE

A shell-type body of spherical curvature is disclosed, the body wall being made of resin reinforced by short length high modulus filaments extending substantially normal to the inner and outer surfaces of the wall, i.e. generally radially, and preferably through the entire wall thickness from one of the surfaces to the other. Complete spheres of this construction are particularly suited for deep submergence work under high external hydrostatic pressures, being characterized by a low weight to displacement ratio and a high compressive strength to weight ratio. Various methods of constructing such bodies, preferably utilizing assemblies of precured, unidirectional filament and resin blocks, are also disclosed.

---

This invention relates to underwater research and exploration vessels, and in particular to methods of manufacturing such vessels.

Hollow vessels capable of withstanding extremely high external pressures are in great demand for oceanographic and various other types of underwater research and exploration, to serve as the load-carrying envelopes for underwater structures, as vehicles for men and/or instruments, and as buoyant elements for attachment to underwater vessels. Such a vessel when made out of a solid, monolithic metal shell has well-known superior strength characteristics and resistance to buckling under the tremendous compressive stresses to which it is subjected at great depths below the surface of the water, but metallic vessels are disadvantageous in that their strength-to-weight ratio is relatively low, while their weight-to-displacement ratio is relatively high.

It is an important object of the present invention, therefore, to provide vessels capable of withstanding high external pressures and possessed of relatively high ratios of compressive strength to weight and of elastic stability to weight, and a relatively low ratio of weight to displacement.

It is another object of the present invention to provide novel methods of manufacturing such vessels of filament-reinforced resin bodies in which bodies all the fibers are oriented substantially parallel to each other.

It is still another object of the present invention to provide methods of making such resin and fiber vessels of spherical shape which are characterized by the fact that all the fibers in each vessel are oriented substantially radially of the vessel.

More specifically, it is an object of the present invention to provide spherical vessels of this type, herein termed "radial-filament spheres," which do not require special polar caps or fittings to permit access to their interiors, which can be locally opened and closed as well as repaired by the removal and replacement of relatively small wall sections without impairing vessel strength, and which can be assembled from structural elements made of unidirectional filament-reinforced resin.

The foregoing and other objects of the present invention, as well as the characteristics and advantages thereof, will be more clearly understood from the following detailed description of preferred embodiments of the invention when read in conjunction with the accompanying drawings, in which:

FIG. 1 is perspective illustration of a radial-filament sphere constructed of two identical hemispheres each built up in accordance with one aspect of the present invention;

FIG. 2 is a fragmentary vertical section through the sphere shown in FIG. 1;

FIG. 3 is a perspective elevational view of the starting basic structural member employed in large numbers in the manufacture of the sphere shown in FIGS. 1 and 2;

FIG. 4 is a similar view of the said member as modified prior to use in the actual build-up of the hemispheres;

FIG. 5 is a plan view of the member shown in FIG. 4 and illustrates a further structural modification thereof which is effected prior to the hemisphere-building operation;

FIG. 6 is an elevational view of a partly built-up hemisphere which when completed is to be used in making the sphere of FIG. 1;

FIG. 6a is a fragmentary diagrammatic illustration of the manner of building of the hemisphere shown in FIG. 6 from the structural members of FIG. 5;

FIG. 7 is a diagrammatic illustration of the effect of compressive stresses on a unidirectional or parallel-filament member of the type employed in the practice of the present invention;

FIG. 8 is a perspective illustration of a radial-filament sphere constructed of two identical hemispheres each built up in accordance with another aspect of the present invention;

FIG. 9 is a plan view of a built-up intermediate structural member employed in building up the hemispheres used in constructing the sphere shown in FIG. 8;

FIG. 9a is a somewhat enlarged perspective illustration of the starting structural member employed in building up the intermediate member shown in FIG. 9;

FIG. 10 is a side elevational view of the said intermediate member, taken along the line 10—10 in FIG. 9;

FIGS. 11 and 12 are schematic elevational views of a hemispherical mandrel and illustrate the first two steps in the method of building a radial-filament hemisphere in accordance with yet another aspect of the present invention;

FIG. 13 is a sectional view taken along the line 13—13 in FIG. 12;

FIG. 14 is an elevational view of the mandrel, similar to FIG. 12, and illustrates the next step of the method according to this aspect of the present invention;

FIG. 15 is an elevational view of the mandrel, seen at an angle of 45° to the plane of FIG. 14, and illustrates further steps of this method;

FIG. 16 is a perspective view of a large block of unidirectional filament-reinforced resin which can be employed as the basic starting material for the construction of radial-filament spheres in accordance with the present invention;

FIGS. 16a and 16b are similar views illustrating, respectively, severed parts of the block of FIG. 16 and their reassembly into a relatively thin unidirectional slab;

FIG. 17 is a fragmentary perspective illustration of the slab of FIG. 16b as cut transversely in the first step of a sphere-constructing method according to yet another aspect of the present invention;

FIG. 18 is a perspective illustration of a built-up intermediate structural member made from the cut slab shown in FIG. 17;

FIGS. 19, 19a and 19b are side elevational, top plan and end elevational views, respectively, of further intermediate structural members cut from the member of FIG. 18;

FIGS. 20 and 20a are perspective illustrations, respectively, of parts of a sphere built up from a multiplicity of the members shown in FIGS. 19 to 19b by further steps of this method;

FIG. 21 is a fragmentary diagrammatic illustration of a radial-filament sphere shell and illustrates one of the advantages of structures produced in accordance with the principles of the present invention; and FIG. 21a is a similar view of a conventional filament-wound sphere shell and illustrates one of the disadvantages of such a construction.

Generally speaking, the present invention is based on the fact that, when a three-dimensional structure composed of a cured thermosetting resin matrix having embedded therein a multiplicity of parallel, unidirectional, high-modulus filaments is subjected to bi-directional compressive stresses normal to the filament orientation, the filaments are stressed in tension. This is diagrammatically illustrated in FIG. 7 wherein B denotes a rectangularly prismatic structure, composed of a cured resin matrix having embedded therein a great number of filaments (not shown) all oriented parallel to each other in the direction of the double-headed arrow F, and subjected to balanced compressive stresses $\sigma'$ and $\sigma''$ which are perpendicular both to each other and to the filament direction. Under such conditions, the filaments are stressed in tension as indicated by the arrows T.

In a hollow spherical vessel subjected to external hydrostatic pressure over its entire surface, the external pressure is opposed by balanced circumferential stresses in the wall of the vessel, and any given element of such a body can thus be considered as being subjected to two perpendicular compressive stresses, both essentially parallel to the surface. The general equation for the circumferential stress in a spherical shell under external hydrostatic pressure is (1) $$\sigma = \frac{Pr}{2t}$$

where P is the unit pressure, r is the mean radius of the sphere, and t is the wall thickness of the shell. If, now, each such element of the shell body is composed of a unidirectional-filament slab in which all the individual fibers are oriented substantially radially of the sphere and thus normal to the plane of application of the compressive stresses, the fibers in each element of the shell body will be stressed in tension. Thus, no buckling of the filaments can occur, which obviates the requirement of a high degree of straightness in the fibers and effective lateral support by the resin. It will be readily recognized that this is precisely opposite to the situation existing in conventional filament-wound spheres, where transverse buckling of the filament windings is resisted only by the lateral support provided by the resin.

It can be shown that the critical pressure $P_c$ for the buckling of a spherical shell of wall thickness t and radius r is (2) $$P_c = k \frac{E}{\sqrt{1-\nu^2}} \left(\frac{t}{r}\right)^2$$

where E is the modulus of elasticity, $\nu$ is Poisson's ratio, and k is an empirically determinable numerical constant. Deep submergence vessels are also generally characterized by a figure of merit M which is defined by the relation (3) $$M = \frac{W}{D}$$

where W is the weight of the vessel, and D is the weight of the water displaced thereby. For a given value of the critical pressure for buckling, the quantity W/D, which is the weight-to-displacement ratio, is related to the nature of the material of which the vessel is made by the proportionality (4) $$\frac{W}{D} \sim \frac{\rho}{\sqrt{E}}$$

where $\rho$ is the density of the wall material. It will be evident that a low value for the ratio W/D represents a large payload capability for the vessel, and from Equation 1 that the wall thickness t should be in direct proportion to the radius of the vessel, so that vesels of different sizes will have the same pressure capabilities.

From Equations 2 to 4 it can be seen, therefore, that for a sphere of a given size and intended for a specified critical pressure, better performance (lower W/D) results from a higher modulus E, which permits a decreased wall thickness t, and from a lower density $\rho$. Effective implementation of the principles of the present invention thus entails the use of unidirectional fiber and resin building elements having an optimally low value of $\rho/\sqrt{E}$, a ratio which decreases as E increases, E in this case being the transverse modulus of the element (i.e. the modulus perpendicular to the filament direction). It is preferred to employ both resin and fiber components of high modulus, since both contribute to the transverse modulus of the composite element. Nevertheless, it will be understood that other factors, e.g. permissible density, weight, etc., may place limitations on the choice of resin and/or fiber for the elements.

Merely by way of example, we have found that excellent results are achieved by using glass filaments (having a modulus in the range of about 10,000,000 to 12,500,000 p.s.i.) as the fiber component in a resin matrix composed of an epoxy resin system marketed by Minnesota Mining and Manufacturing Company under the designation "1009" (having a modulus of about 430,000 p.s.i.). Alternatively, the fiber component of the building elements may include asbestos fibers (modulus in the range of about 24,000,000 to 25,000,000 p.s.i.), boron filaments (modulus in the range of about 50,000,000 to 60,000,000 p.s.i.), carbon filaments (modulus in the range of about 20,000,000 to 70,000,000 p.s.i.), sapphire whiskers, tungsten whiskers, etc. The resin component may be such epoxy resin systems as are marketed by Union Carbide Corporation under the designations "ERL–2256" (modulus about 550,000 p.s.i.), "ERRA–0300" (modulus about 720,000 p.s.i.) and "EP–2114" (modulus about 1,030,000 p.s.i.), as well as other epoxies, and various other resins such as phenolics, melamines, and the maleic alkyd/styrene copolymer types of polyester resins, characterized by relatively low values of $\rho/\sqrt{E}$. We have found, for example, that an element such as shown in FIG. 7 and composed of an epoxy resin matrix (Minnesota Mining and Manufacturing Company's type "1009") having embedded therein unidirectional filaments of "S" glass (77% of the total volume) can withstand balanced compressive stresses of 165,000 p.s.i. in each of the $\sigma'$ and $\sigma''$ directions.

FIGS. 1 and 2 show a radial-filament hollow sphere 25 constructed of two hemispheres 25a and 25b each built up in accordance with the principles of the present invention. The method here employed, which we term the "lune" method, uses as the starting material a precured unidirectional sheet composed of a resin matrix, e.g. epoxy resin, and glass or other filaments embedded therein, the filaments extending parallel to each other and to the wide faces of the sheet. The sheet is first severed into a plurality of thin strips 26 (FIG. 3), the direction of cutting being perpendicular to both the direction of the filaments and the plane of the sheet. Each strip 26 thus has a multitude of short, closely packed filament lengths extending perpendicularly to its wider faces, as indicated diagrammatically at 26a. The thickness of the strips 26 will, of course, depend on the intended structural and strength characteristics of the sphere to be constructed.

Each strip 26 is then cut into the shape of a half-lune 27 (FIG. 4), and a double-faced, pressure-sensitive adhesive tape 28 is applied to one face of each half-lune 27. As the final preparatory step, each half-lune 27 is cut in a grid-like pattern (FIG. 5), severing it to, but not through, the adhesive tape backing. The bits 27a thus remain adhered to the backing tape, and the assembly thereby has a two-dimensional formability, i.e. the ability to bend somewhat both longitudinally and transversely.

The manner in which the various half-lunes 27 are built up into the form of a hemiphere 25a (or 25b) is best shown in FIGS. 6 and 6a. The only equipment required for this operation is a destructible spherical mandrel 29 of the appropriate outer diameter, made conveniently of a low-melting alloy, e.g. Wood's metal. As is clearly apparent, the building method involves laying the individual half-lunes 27 onto the mandrel with their respective adhesive tape backings in contact with the mandrel. Thus, each half-lune is applied to the mandrel by initially positioning the wide end 27b parallel to the "equator" of the mandrel, as indicated in solid lines in FIG. 6a, and then bending the strip over into its final, curved, mandrel-conforming position, as indicated in broken lines in FIG. 6a, so that the apex 27c of the half-lune essentially reaches the "pole" of the mandrel. It should be understood that in actual practice it will be preferable to use half-lunes 27 of such sizes that when they are adhered to the mandrel, their wider ends 27b are located slightly below the mandrel "equator," for a reason which will become clear as the description proceeds.

After this building operation has been completed, the assembly is vacuum-impregnated on the mandrel with an appropriate thermosetting resin, e.g. epoxy resin, to fill the respective spaces between adjoining half-lunes and between adjoining bits 27a, and is cured on the mandrel to complete the setting of the filling resin. Thereafter, the mandrel is removed, as by melting it out, and the interior of the hemisphere is cleaned, at which time the tape 28 is also removed. The annular equatorial surface of the hemisphere is then cut and ground true, so it can mate with another like hemisphere. Two identical hemispheres are finally equatorially joined together by means of an epoxy resin adhesive, for example that marketed by Shell Oil Company under the designation Epon–934. The so-assembled sphere is then again subjected to a curing operation to set the adhesive.

For a radial-filament sphere of this type, having a 3-inch inner diameter, we have found a wall thickness of 0.180 inch (the component strips being transversely cut to that thickness from a ⅜-inch thick unidirectional sheet of epoxy-bonded glass filaments obtained from the Minnesota Mining and Manufacturing Company and available in various thicknesses) to be sufficient to provide a collapse pressure in excess of 13,000 p.s.i. at a weight-to-displacement ratio of 0.53. A comparable filament-wound and internal ring-stiffened construction having a collapse pressure of 13,600 p.s.i. is found to have a weight-to-displacement ratio of 0.62, the increase of about 17% in weight representing a correspondingly reduced payload capability.

A somewhat different method, herein termed the "⅓ octant" method, of building a radial-filament sphere from unidirectional resin and filament sheets is illustrated in FIGS. 8 to 10. As before, the sphere 30 (FIG. 8) is constructed by joining two identical hemispheres 30a and 30b. Each hemisphere is, however, made up of four quadrant sectors 31, each of which is an octant of a sphere, and each quadrant of the hemisphere is made up of three substantially identical, four-sided, spherically curved segments 32 (see also FIGS. 9 and 10) the areas and contours of which can be easily calculated from known geometrical considerations.

As the first step of the hemisphere-building method according to this aspect of the present invention, a number of elongated planar strips 33 (FIG. 9a) somewhat greater than the number required for the segment 32 to be formed is assembled in side-by-side relation and clamped together against a flat surface, with the fibers oriented normal to said surface. A thin sheet 34 of rubber or other flexible material capable of being formed smoothly over a doubly curved surface is then cemented to the entire exposed face of this assembly of strips. The assembled strips are then cut transversely to their lines of juncture, down to but not through the flexible sheet 34, resulting in the formation of a relatively large number of small bits 33a which are cemented only to the rubber sheet but not to each other. This assembly is then laid onto a spherically curved mandrel of proper radius (with the sheet 34 against the mandrel surface) and is impregnated with epoxy resin to fill the numerous essentially V-shaped cracks between the bits. After the resin filling is cured, the segment is cleaned of the sheet backing and excess resin, and cut and trimmed to proper contours as shown in FIG. 9. Three such cured segments 32 are then assembled on a hemispherical mandrel and fitted together to constitute a quadrant 31 of the hemisphere, and epoxy resin is applied to the mating or abutting surfaces of the segments and cured to complete the quadrant. Four such quadrants, properly trimmed, are assembled on a spherical mandrel, and epoxy resin is applied to their mating surfaces and cured, to complete the hemisphere (30a or 30b). Two such hemispheres are thereafter equatorially joined as before by an epoxy resin bond to complete the sphere.

Yet another method of building radial-filament spheres according to the present invention is illustrated in FIGS. 11 to 15. In this method, herein termed the "strip" method, elongated strips 35 of unidirectional bits are employed, each strip consisting of an end-to-end arrangement of a number of such bits adhered at one face to a double-faced, pressure-sensitive adhesive tape 37 (similar to the tape 28 shown in FIGS. 2, 4 and 6). The filaments are, as before, perpendicular to the tape backing. The method involves first forming an equatorial region, one or more strips in width, along the "equator" of the spherical mandrel 29 (FIG. 11), the strips 35 being secured to the mandrel by the tape. Thereafter, one or more strips 35a are laid along a great circle path across the "pole" of the mandrel, joining two diametrally opposite sections of the uppermost edge of the topmost equatorial strip 35 (FIGS. 12 and 13). Two quarter-circle strips 35b are then laid onto the mandrel, spaced 90° from strips 35a and extending from opposite sides of polar strips 35a down to the corresponding diametrally opposed sections of the upper edge of the topmost equatorial band 35 (FIG. 14). At this stage, therefore, there are still open four spherically triangular sections of the hemisphere. These are then filled in progressively by applying further strips 35c etc. (FIG. 15) cut to suitable shape where they meet corners of the respective triangles. It is again noted that in actual practice the lowermost strip 35 will preferably extend somewhat below the "equator" of the mandrel 29. After the hemisphere has been completed in this manner, the cracks are filled in with epoxy resin as previously described, and the entire assembly is cured and, after removal of the mandrel and the tape, machined accurately in the equatorial plane. A complete sphere is then formed, as above, by cementing two such hemispheres to each other along their equatorial edges.

Still another method of constructing radial-filament spheres according to the present invention, herein designated the "barrel" method, employs as the starting material a block 38 of unidirectional, resin-bonded filaments (FIG. 16), of appropriate transverse dimensions, in which the filaments run lengthwise of the block. The block is cut in planes transverse to the filament direction, as indicated by the lines 39, into a plurality of relatively thin strips 40 which are then laid on their sides (FIG. 16a), assembled in side-by-side relation (FIG. 16b), and cemented to one another at their abutting edges 40a to form a thin panel 41 (similar, but for the joints, to the strip 26 shown in FIG. 3). It will be understood that the thickness of each of the strips 40 cut from the block 38 will be equal to the desired wall thickness of the ultimate spherical shell body.

The flat panel 41, having all filaments oriented normal to its broad faces, is then severed along oblique planes, as indicated by the lines 42 (FIG. 17), to provide a plurality of relatively narrow strips 43 of essentially trapezoidal cross-section. These strips are then separated, alternate ones are inverted, and all are reassembled and cemented along their abutting faces 43a (FIG. 18), resulting in the formation of a sector 44 of a right circular cylinder (FIG. 18). Merely by way of example, for the member 44 enough strips 43 are employed to form a 90° sector. (It should be understood that the elements 43 are drawn to a greatly enlarged scale in FIGS. 17 and 18 and that actually many more than five strips will be required to make up such a sector 44.) The cylindrically curved sector 44, having the individual fiber lengths extending perpendicularly to the inner and outer surfaces of the sector, is then severed into a plurality of strips 45 (FIGS. 19, 19a and 19b) by making suitable paired oblique planar cuts through the sector 44 in the circumferential direction thereof, as indicated by the dot-dash lines 46–46a in FIG. 18, the paired planes of cutting being so oriented as to intersect at the axis of curvature of the sector 44.

A sufficient number of such strips 45 is then reassembled and cemented to each other in side-by-side relation (after the removal of the waste material resulting from the cutting operation) and the cement cured to form a barrel-like body 47 (FIG. 20) essentially having the shape of a spherical segment of two bases but differing therefrom slightly in that the annular edge surface 47a of each cut-off area is a zone of a cone having its apex at the center of the sphere. It will be clear, of course, that the body 47 may be formed by first building up a plurality of intermediate members in the shape of spherical sectors (not shown) from the strips 45 and then assembling such sectors into the final configuration shown in FIG. 20. By virtue of the initial formation of a 90° cylindrical sector 44, therefore, the body 47 extends 45° from either side of the "equator" of the sphere, but this can obviously be varied as desired. Finally, a second such barrel-like body or a substantial lesser part thereof, e.g. a spherical sector of sufficient areal size, is assembled and cured in the same manner to provide two blanks from which two complementary polar caps 48 (only one is shown in FIG. 20a) having boundary edge surfaces 48a mated in size and orientation to the surfaces 47a of the body 47 can be derived, e.g. machined, these caps then being cemented and cured to the body 47 to complete the sphere, as indicated in phantom outline in FIG. 20.

Alternatively, a spherically curved sector (not shown) built up from the strips 45 may be trimmed, cut, precision ground, etc. in any desired manner, for example to the dimensions of a one-third quadrant of a hemisphere as explained hereinbefore in connection with FIGS. 8 to 10, or it may be employed as any other portion of a spherical shell which can be bonded to suitably mated shell segments to complete the desired sphere.

Despite differences in the various above-described methods of construction, all spheres built up in accordance with the principles of the present invention will perform substantially equally well under identical environmental conditions, subject to the qualification that the presence of the resin-filled V-joints or spaces between adjoining elements in the spheres produced by the "lune," "⅓-octant" and "strip" methods of construction dilutes slightly the effective modulus of the shell and thus effects a corresponding decrease in its critical pressure. It will be apparent, however, that such V-spaces may be filled with tapered pieces of unidirectional fiber-reinforced resin cut from the same material as the other elements, which pieces would be cemented in place with the fiber lengths therein also oriented substantially radially of the sphere, whereby the aforesaid slight decrease in the effective modulus and critical pressure could be avoided. In the barrel method, of course, no such considerations arise since the building elements 43 and 45 are cut obliquely so that the abutting faces meet without substantial cracks or spaces therebetween. In any event, the effectiveness of all these spheres in sustaining extremely high external pressures stems directly from the radial orientation of the filaments which provides, under conditions of balanced biaxial stress, strength and elastic stability far beyond those of conventional filament-wound constructions. Stated in other words, the radial filament configuration of the present invention is circumferentially isotropic, i.e. it is equally effective in all circumferential directions, whereas in conventional filament-wound structures a given filament provides support primarily in a single direction, which makes it approximately one-half as effective as the filaments in the structures according to the present invention.

It should also be noted that the uncured unidirectional filament and resin material, which is used to make the basic building elements of the spheres, generally is relatively resin-rich (resin about 35 to 50% of the total volume) and thus has a maximum filament content of about 65%. We have found it advantageous, however, to use a filament content above about 65% and preferably in the range of about 75 to 90% of the total volume. This condition can be readily achieved by squeezing out some of the resin from the uncured material prior to the curing thereof. The reason is that with a higher filament content in the shell wall, the sphere can withstand higher external hydrostatic pressures. Nevertheless, the principles of the present invention can also be implemented by using the original material of unreduced resin content, it being understood that the critical pressure rating of a sphere so produced will be somewhat lower than that of a sphere having a reduced resin content and thus an increased fiber content.

As an example of the present invention, we have constructed a radial-filament sphere 3 inches in diameter, by the method of FIGS. 11 to 15 described herein, from fiber glass-epoxy prepreg tape having a resin of modulus 430,000 p.s.i. and glass of modulus 12,400,000 p.s.i. (supplied by Minnesota Mining and Manufacturing Company under the designation 1009–26S). The volume fraction of filaments present in the sphere was 77%, and the sphere had a weight-to-displacement ratio $(W/D)$ of 0.50. In actual tests, this sphere sustained an external hydrostatic pressure of 25,000 p.s.i. without failure.

Still further advantages of the radial-filament sphere construction according to the present invention will become evident from a consideration and comparison of FIGS. 21 and 21a of the drawings. Thus, as shown in FIG. 21, in a radial-filament spherical shell 49 it is possible to provide a port opening 50 with radial boundary surfaces, as indicated by the broken lines 50a and 50b. Since the filaments are also substantially radially oriented, the port opening can be formed by cutting a segment of suitable size directly out of the shell wall without introducing any end-loading stresses, and without any need to provide means for preventing failure of the structure by spreading or delamination of the wall. By way of contradistinction, as shown in FIG. 21a, in a conventional filament-wound spherical shell 51 the provision of a port opening 52, even with radial boundary surfaces, entails cutting across the filaments, which automatically introduces end-loading stresses and makes it imperative to provide supporting flanges at the opening to prevent failure by spreading or delamination. From this it will be appreciated that in the event a portion of a radial-filament sphere is damaged, it is possible to repair the same quite easily, since it is necessary simply to cut out the damaged portion with a radial cut and to replace the removed shell portion with an identical mating radial-filament section which can be cemented in place to repair the shell without loss of strength. It will be equally evident that this type of repair is impossible in a conventional filament-wound shell since the severed filaments around the damaged area cannot be reconnected.

Yet another advantage of the radial-filament construction of the present invention is that a sphere of this type need not be provided with polar end fittings or caps to provide access to the interior of the sphere. Especially where the sphere is initially constructed of two identical hemispheres, it is possible to insert the payload, e.g. the instruments and/or other materials, into one of the hemispheres prior to the cementing thereof to the other hemisphere for completion of the sphere, whereby the entire interior of the sphere is available for payload. This is essentially impossible in a filament-wound sphere which at all times requires the provision of generally metal polar caps or fittings to provide access to the interior of the sphere, and since a filament-wound sphere can only be formed as an entity, the polar openings therein must of necessity be relatively small, limiting the degree of access obtainable and concomitantly limiting the sizes and character of instrumentalities which can be inserted into the sphere to width dimensions less than the diameter of such openings. In addition, the need for metal polar fittings in a filament-wound sphere increases its weight-to-displacement ratio which, as previously mentioned, decreases its payload capability in corresponding degree.

It is to be understood that the foregoing description is for purposes of illustration only, and that the structural and procedural features and relationships as well as the types, ranges and proportions of component materials disclosed herein are merely representative and are susceptible to various changes and modifications none of which entails a departure from the spirit and scope of the present invention as defined in the hereto appended claims.

Having thus described our invention, what we claim and desire to protect by Letters Patent is:

1. A hollow shell-type body of spherical curvature, tne body wall being made of resin reinforced by short length filaments, and the individual filaments extending substantially normal to the inner and outer surfaces of said wall.

2. A hollow shell-type body of spherical curvature, the body wall being made of resin reinforced by short length filaments, and the individual filaments extending from the inner to the outer surface of said wall substantially normal to said surfaces.

3. A shell-type body according to claim 2, wherein the filaments occupy a major portion of the total volume of said wall.

4. A shell-type body according to claim 3, wherein the filament content of said wall is between about 65 and 90% of said total volume thereof.

5. A shell-type body according to claim 1, wherein said body is less than a compete sphere.

6. A shell-type body accoridng to claim 1, wherein said body is a complete sphere.

7. A shell-type body accoring to claim 6, wherein the resin/filament combination is such that the weight-to-displacement ratio of the sphere is less than about 0.55.

8. A shell-type body according to claim 2, wherein said said wall comprises an assembly of small unidirectional filament and resin blocks having opposite plane and parallel faces, the individual filament lengths in each block being substantially parallel to each other and normal to said opposite faces of the respective block.

9. A hollow fiber-reinforced resin sphere composed of a plurality of small adheringly interconnected members having opposite plane faces defining, in the finally assembled state of said members, the inner and outer surface of the sphere, the individual fiber lengths in each of said members being oriented substantially normal to said plane faces thereof.

10. A hollow sphere according to claim 9, said fiber lengths in each of said members extending entirely through the same from one of said plane faces thereof to the other.

11. A deep submergence vessel capable of withstanding high external hydrostatic pressures, comprising a hollow spherical shell the wall of which is composed of a thermosetting resin reinforced by high modulus fibers, the individual fiber lengths in said wall being oriented substantially radially of said shell and extending from the outer to the inner surface of said wall.

References Cited

UNITED STATES PATENTS

| | | | |
|---|---|---|---|
| 3,095,993 | 7/1963 | Balcom et al. | 220—5 |
| 3,357,594 | 12/1967 | Grosh et al. | 220—5 |

JAMES B. MARBERT, Primary Examiner